United States Patent
Zhang et al.

(10) Patent No.: US 9,020,467 B2
(45) Date of Patent: Apr. 28, 2015

(54) METHOD OF AND SYSTEM FOR EXTENDING THE WISPR AUTHENTICATION PROCEDURE

(75) Inventors: David Xining Zhang, San Jose, CA (US); Huiyue Xu, Beijing (CN); Bing Li, Beijing (CN)

(73) Assignee: Aicent, Inc., San Jose, CA (US)

( * ) Notice: Subject to any disclaimer, the term of this patent is extended or adjusted under 35 U.S.C. 154(b) by 4 days.

(21) Appl. No.: 13/299,625

(22) Filed: Nov. 18, 2011

(65) Prior Publication Data

US 2012/0149334 A1    Jun. 14, 2012

Related U.S. Application Data

(60) Provisional application No. 61/415,734, filed on Nov. 19, 2010.

(51) Int. Cl.
*H04W 12/06* (2009.01)
*H04L 29/06* (2006.01)

(52) U.S. Cl.
CPC ........ *H04L 63/0838* (2013.01); *H04L 63/0853* (2013.01); *H04L 63/0892* (2013.01); *H04W 12/06* (2013.01)

(58) Field of Classification Search
CPC ..... G06F 21/31; H04L 63/08; H04L 63/0815; H04L 63/0846; H04L 9/32; H04W 12/06; H04W 74/004; H04W 80/04; H04W 84/12
USPC ................... 455/411, 432.1, 433, 435.1–439; 370/328–338, 395.2–395.42; 380/247–250; 713/168–170; 726/1–10
See application file for complete search history.

(56) References Cited

U.S. PATENT DOCUMENTS

| | | | |
|---|---|---|---|
| 6,308,267 B1 | 10/2001 | Gremmelmaier | |
| 6,466,804 B1 | 10/2002 | Pecen et al. | |
| 6,978,157 B1 | 12/2005 | Amiens | |
| 7,065,340 B1 | 6/2006 | Einola | |
| 7,171,460 B2 | 1/2007 | Kalavade et al. | |
| 7,359,704 B1 | 4/2008 | Dizdarevic et al. | |
| 7,787,600 B1 | 8/2010 | Bari | |
| 2002/0009199 A1* | 1/2002 | Ala-Laurila et al. | 380/247 |

(Continued)

OTHER PUBLICATIONS

European Telecommunications Standards Institute, "Digital cellular telecommunications system (Phase 2); Mobile Application Part (MAP) specification (GSM 09.02)," European Telecommunication Standard, ETS 300 599, Jan. 1997, 4th ed., pp. 1-400.

(Continued)

*Primary Examiner* — Chuong A Ngo
(74) *Attorney, Agent, or Firm* — Haverstock & Owens LLP

(57) ABSTRACT

A method and system for completing the authentication process of a user device in a second communication network (such as Wi-Fi or WiMAX) utilizes the user credential (such as a SIM card, a USIM card, or a RUIM card) of a first communication network (such as GSM, CDMA, EDGE, or LTE). A client, such as a software module, executes on the wireless device. An authentication platform retrieves the SIM card credential information in the first communication network and passes the information to the authentication platform of the second communication network, thereby granting the client access to the second communication after the authentication platform validates with the first communication network.

38 Claims, 4 Drawing Sheets

(56) References Cited

U.S. PATENT DOCUMENTS

| | | | |
|---|---|---|---|
| 2002/0187777 A1 | 12/2002 | Osterhout et al. | |
| 2002/0191575 A1 | 12/2002 | Kalavade et al. | |
| 2003/0214958 A1 | 11/2003 | Madour et al. | |
| 2004/0005886 A1 | 1/2004 | Oda et al. | |
| 2004/0248547 A1 | 12/2004 | Philsgard et al. | |
| 2005/0177733 A1 | 8/2005 | Stadelmann et al. | |
| 2005/0220139 A1 | 10/2005 | Aholainen | |
| 2006/0251008 A1 | 11/2006 | Wu et al. | |
| 2007/0019580 A1 | 1/2007 | Zhang et al. | |
| 2007/0019623 A1 | 1/2007 | Alt et al. | |
| 2007/0117577 A1 | 5/2007 | Harris | |
| 2007/0178885 A1 | 8/2007 | Lev | |
| 2007/0183363 A1 | 8/2007 | Liden | |
| 2007/0186106 A1 | 8/2007 | Ting et al. | |
| 2007/0208936 A1 | 9/2007 | Ramos Robles | |
| 2007/0254648 A1 | 11/2007 | Zhang et al. | |
| 2008/0077789 A1 | 3/2008 | Gondo | |
| 2008/0085707 A1 | 4/2008 | Fadell | |
| 2008/0260149 A1 | 10/2008 | Gehrmann | |
| 2009/0059874 A1 | 3/2009 | Carter | |
| 2009/0094680 A1 | 4/2009 | Gupta et al. | |
| 2009/0205028 A1 | 8/2009 | Smeets et al. | |
| 2009/0221265 A1 | 9/2009 | Liu et al. | |
| 2009/0271852 A1* | 10/2009 | Torres et al. | 726/6 |
| 2010/0146262 A1 | 6/2010 | Zhang | |
| 2010/0232407 A1 | 9/2010 | Navali et al. | |
| 2010/0263022 A1 | 10/2010 | Wynn et al. | |
| 2010/0313020 A1* | 12/2010 | Montemurro | 713/168 |
| 2011/0007705 A1 | 1/2011 | Buddhikot et al. | |
| 2011/0041167 A1 | 2/2011 | Nguyen | |
| 2011/0047603 A1* | 2/2011 | Gordon et al. | 726/5 |
| 2011/0154454 A1* | 6/2011 | Frelechoux | 726/5 |
| 2011/0165896 A1 | 7/2011 | Stromberg et al. | |
| 2011/0277019 A1* | 11/2011 | Pritchard, Jr. | 726/4 |

OTHER PUBLICATIONS

European Telecommunications Standards Institute, "Digital cellular telecommunications system (Phase 2); Mobile Application Part (MAP) specification (GSM 09.02)," European Telecommunication Standard, ETS 300 599, Jan. 1997, 4th ed., pp. 401-781.

International Search report dated Jul. 10, 2012, International Application No. PCT/US2011/61395, Intl. Filing Date: Nov. 18, 2011, 14 pages.

International Search Report dated Jul. 10, 2012, International Application No. PCT/US2012/30986, Intl. Filing Date: Mar. 28, 2012, 12 pages.

MobileIGNITE, "Mobileignite Adds Eight New Members," pp. 1-2, Jan. 25, 2006.

D. Bendor, OutSmart, North America, "FMC: A Driving Trend," Pipeline, vol. 2, Issue 1, Jun. 2005, Pipeline Publishing LLC, pp. 1-2.

MobileIgnite, "Voice Call Handover Service: Functional Specification," Version 1.0, Sep. 21, 2006, Interoperability Group "Best Practices," pp. 1-52.

P. Congdon et al., "IEEE 802.1X Remote Authentication Dial in User Service (RADIUS) Usage Guidelines," Network Working Group, Request for Comments: 3580, Sep. 2003, http://www.ietf.org/rfc/rfc3580.txt, pp. 1-30.

H. Haverinen (ed.) et al., "Extensible Authentication Protocol Method for Global System for Mobile Communications (GSM) Subscriber Identity Modules (EAP-SIM)," Network Working Group, Request for Comments: 4186, Jan. 2006, http://www.ietf.org/rfc/rfc4186.txt, pp. 1-92

J. Arkko et al., "Extensible Authentication Protocol Method for 3rd Generation Authentication and Key Agreement (EAP-AKA)," Network Working Group, Request for Comments: 4187, Jan. 2006, http://www.ietf.org/rfc/rfc4187.txt, pp. 1-79.

B. Anton et al., "Best Current Practices for Wireless Internet Serivice Provider (WISP) Roaming," Wi-Fi Alliance-Wireless ISP Roaming (WISPr) Version: 1.0, Feb. 2003, pp. 1-37.

Wireless Broadband Alliance, "WISPr 2.0," Doc Ref. No. WBA/RM/WISPr Version 01.00, Apr. 8, 2010, pp. 1-58.

Wireless Broadband Alliance, "EAP over WISPr 2.0 Trial," Jun. 9, 2010, pp. 1-22.

3GPP Organizational Partners (ARIB, ATIS, CCSA, ETSI, TTA, TTC), "3rd Generation Partnership Project; Technical Specification Group Core Network and Terminals; Mobile Application Part (MAP) specification (Release 9)," 3GPP TS 29.002, V9.1.0, Mar. 2010, pp. 1-923.

European Telecommunications Standards Institute, "Digital cellular telecommunications system (Phase 2+); Specification of the Subscriber Identity Module-Mobile Equipment (SIM-ME) interface; (GSM 11.11)," GSM Technical Specification, Jul. 1996, Version 5.3.0, pp. 1-113.

M. Kasper et al., "Subscriber Authentication in Cellular Networks with Trusted Virtual SIMS," 10th International Conference on Advanced Communication Technology, ICACT 2008, vol. 2, Gangwon-Do, Feb. 17-20, 2008, pp. 903-908.

* cited by examiner

METHOD OF AND SYSTEM FOR EXTENDING THE WISPR AUTHENTICATION PROCEDURE

RELATED APPLICATION

This application claims priority under 35 U.S.C. §119(e) of the co-pending provisional patent application Ser. No. 61/415,734, filed Nov. 19, 2010, and titled, "Method, System, and Client Software for Extending WISPr Authentication Procedure," which is hereby incorporated by reference.

FIELD OF THE INVENTION

The present invention relates to network-access authentication for roaming into or otherwise accessing wireless telecommunications networks. More specifically, the present invention relates to authenticating users roaming into or accessing Wi-Fi/WiMAX networks using the user credential of a GSM/CDMA/LTE network.

BACKGROUND OF THE INVENTION

Currently, Wi-Fi hotspots are deployed globally by various Wireless Internet Service Providers (WISPS). Electronic devices with Wi-Fi chipsets and capabilities are able to connect to these Wi-Fi hotspots to access data networks, such as the Internet. These devices include, but are not limited to, personal laptops, mobile handsets, televisions, digital cameras, and DVD players. Normally these hotspots require the users to be authenticated and authorized before accessing their network services. The users must supply their own credentials for the Wi-Fi networks to authenticate against the users' home service providers. A typical credential that is widely used in current public hotspot is a username and password combination.

For mobile networks, user credentials are issued as Subscriber Identity Module (SIM) for Global System for Mobile Communications (GSM) networks. A SIM card securely stores a secret authentication key (Ki) identifying a mobile phone service subscriber, as well as subscription information, preferences, and other information. The SIM card also securely stores A3 and A8 programmable algorithms, the same logic as the A3/A8 algorithm stored in the mobile network's Home Location Register (HLR). The SIM card also stores the International Mobile Subscriber Identity (IMSI), which is used to uniquely identify the mobile phone service subscriber. When the SIM card is manufactured, the IMSI is paired with an authentication key Ki, a 128-bit number used for authentication and cipher key generation. The Ki is stored only on the SIM card and at the HLR and is never transmitted across the network, on any link.

The SIM card has corresponding components in different mobile networks. For example, the corresponding component in Universal Mobile Telecommunications System (UMTS) networks is the Universal SIM (USIM) card. The corresponding component in Code Division Multiple Access (CDMA) networks is the Removable User Identity Module (R-UIM) card.

The user credential, as a SIM card, is needed in the smartphone to complete the authentication and service registration procedure in mobile networks. Utilizing the existing user credential for the authentication, authorization, and accounting (AAA) in Wi-Fi/WiMAX networks is a challenge for seamless roaming when offloading mobile data to Wi-Fi/WiMAX networks.

IEEE specification 802.1X defines the encapsulation of the Extensible Authentication Protocol (EAP) over IEEE 802 LAN/WLAN which is known as "EAP over LAN," or EAPOL. The standard formats and procedures to implement SIM-based authentication protocol (Extensible Authentication Protocol (EAP) Method for GSM Subscriber Identity Module, or EAP-SIM, for authentication and session key distribution using the SIM from the GSM) is defined in Internet Engineering Task Force (IETF) Request for Comments (RFC) 4186. IETF RFC 4187 defines the EAP method for UMTS Authentication and Key Agreement (EAP-AKA) authentication.

The 802.1X protocol operates on top of the Network Link Layer, which introduces a high entry barrier for such solutions to be widely adopted by the Wi-Fi hotspots. The protocol requests support from the network side, which requires major changes to the network infrastructure. It also requires support from the client side, which imposes significant demands for the end user's electronics capability enhancement to support 802.1X, and also introduce complex settings that are not easy for normal users to correctly configure. Thus, currently, only a few Wi-Fi hotspots are able to support 802.1X.

Produced in February 2003 and chartered by the Wi-Fi Alliance, "Wireless ISP roaming (WISPr) 1.0" (hereinafter, the "WISPR 1.0 document") is considered the defacto best practices document for implementing roaming between Wi-Fi service providers. Most commercial Wi-Fi networks have been able to support WISPr 1.0, and accordingly, those networks are able to support the Universal Access Method (UAM) protocol that is defined in Appendix D of the WISPr 1.0 document. The WISPr 1.0 document is herein incorporated by reference in its entirety.

UAM authentication for accessing a wireless network is based on the concept of a "walled garden." A walled garden is a "reversed" intranet that prevents a device connected within the walled garden from accessing the Internet prior to being authenticated. This technique, unlike 802.1X, allows the device to bring up all networking layers, including layer 3 (i.e., the IP layer) prior to being authenticated and charged for the session. An Authentication System in the walled garden can be used to perform different types of authentication, including authentication via browser and payment by credit card (not possible with 802.1X). The wireless network operator can also define special policies to allow the end user to access designated Authentication Systems that are not sitting within the walled garden.

But the UAM protocol defined in WISPr 1.0 has known limitations with regard to supporting various authentication protocols. It is not designed to support EAP protocols, and thus cannot be used to support SIM, USIM, and various credentials for Wi-Fi access authentication.

SUMMARY OF THE INVENTION

In accordance with embodiments of the invention, an Authentication System is implemented between a Wireless Internet Service Provider network and a Mobile Network. A SIM card is used as the user credential to be authenticated by the Authentication System against the Mobile Network Authentication Server. The Authentication Server in a GSM network can be the HLR, while in a 3G/4G network, it is the Home Subscriber Server ("HSS"). The Authentication System utilizes the HTTP/S protocol to communicate with the client (e.g., software) running on the user devices, which in turn challenges the SIM card inserted into the device and receives the challenge response from the SIM card. The Authentication System verifies the challenge result against the result returned from a Mobile Network Authentication Server. If the two results match, the Authentication System returns a separate credential to the client software, which can then be used by the client to login to the Wi-Fi network using the WISPr 1.0 protocol.

In one embodiment, the Authentication System must be reached by the client software before it is successfully authenticated and granted a permanent Internet connection. Thus a common variant of one embodiment is that the Authentication System is implemented in the WISP's walled garden environment, which can then be reached by the client without any authentication in advance.

If the Authentication System must be implemented outside the walled garden environment, embodiments of the invention grant the end user a temporary Internet connection. The client can utilize this connection to get authenticated with the Authentication Gateway. After a successful authentication, the client tears down the temporary Internet connection and utilizes a new credential to get a permanent Internet connection.

In one embodiment, the authorization result for accessing a Wi-Fi network is a one-time username and password combination granted by the remote Authentication System. The client uses the one-time username and password to login to the Wi-Fi network using, for example, the Wireless Internet Service Provider Roaming version 1.0 (WISPr 1.0) login procedure.

DETAILED DESCRIPTION OF THE INVENTION

In accordance with the embodiments of the invention, the authentication process in wireless networks is facilitated by introducing new components to the network side, including a public Internet-accessible Authentication Gateway and an Account Databases that hosts temporary user account information. The Authentication System can include multiple modules that support multiple functions, which can include interfacing with smart clients using the HTTP/S protocol and converting HTTP/S messages into SS7/MAP protocols to get challenge vectors from the mobile network authentication server. In one embodiment, a Mobile Application Part (MAP) Gateway converts between AAA and SS7/MAP protocol for Extensible Authentication Protocol-SIM/Authentication and Key Agreement (EAP-SIM/AKA) authentication.

Other embodiments include enhanced smart clients installed in a user's client equipment, such as personal laptops, mobile handsets, televisions, digital cameras, and other consumer electronics equipped with Wi-Fi access availability.

Figure 1:
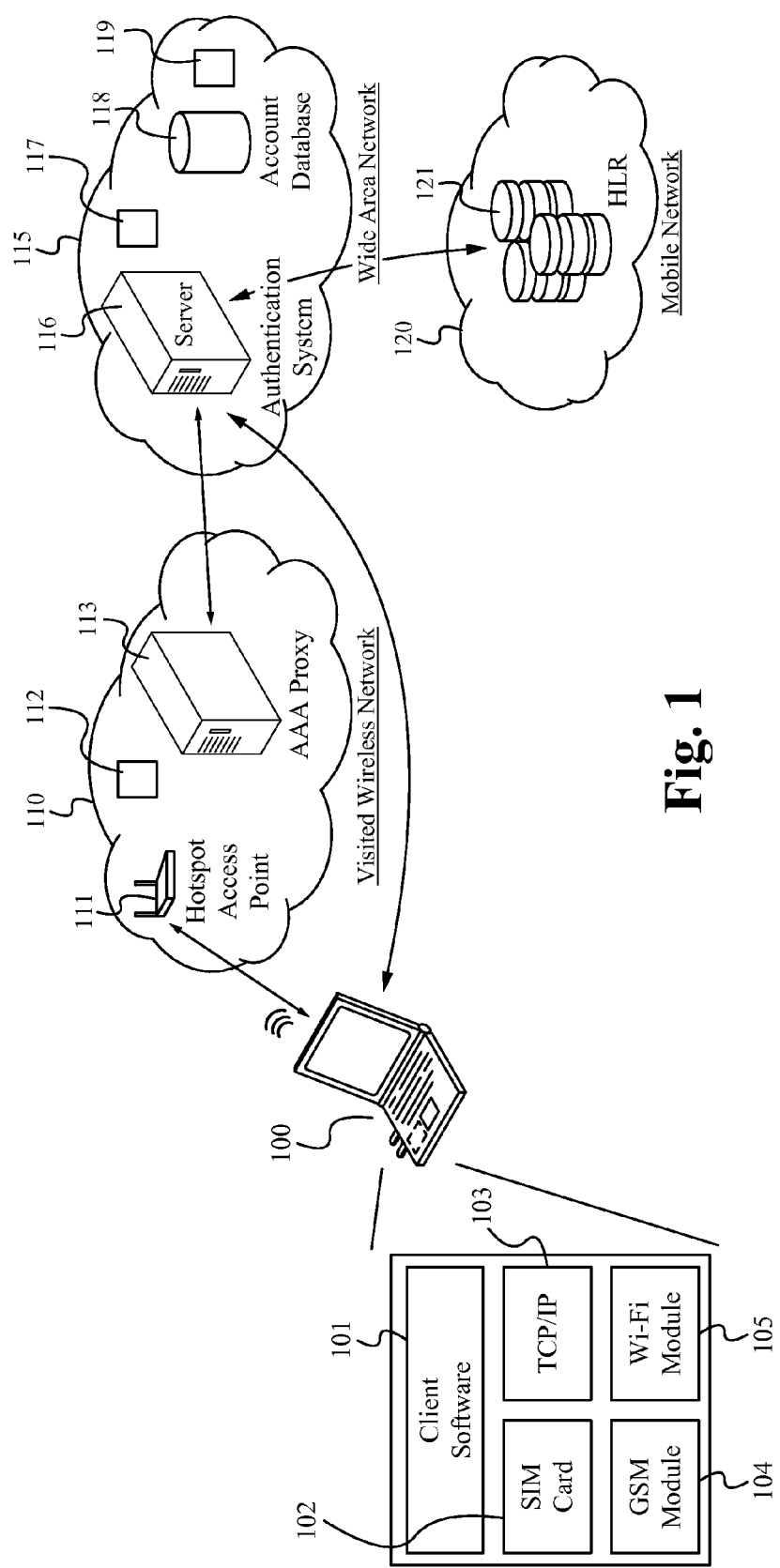
FIG. 1 shows an electronic device accessing a mobile network, using a wireless network and a wide area network, in accordance with one embodiment of the present invention.

FIG. 1 shows an exemplary Wi-Fi environment that includes 3 different networks, 110, 115, and 120. The Visited Wireless Network 110 provides the local Wi-Fi access service to the end users. The network 110 includes various Hotspot Access Points 111 for the end users to connect with, an Access Gateway 112, and an AAA Proxy 113 to validate the end user's credential against the end user's home Authentication System. The Wide Area Network 115, which can be accessed by the end user via an Internet connection, includes an Authentication System 116 (comprising a Web server), an AAA Proxy 117, an Account Database 118, and a MAP Gateway 119. The Mobile Network 120 is the Home Service Provider that issues the SIM card to the end user and includes an HLR 121 as the authentication server for the SIM card (e.g., 102 in device 100).

The user device 100 comprises a client 101 (e.g., software), a SIM card 102, a TCP/IP protocol stack 103, a GSM module 104, and a Wi-Fi module 105. The GSM module 104 uses the SIM card 102, which is issued by the Home Mobile Network 120, and is used as the authentication credential against the HLR 121. The Wi-Fi module 105 provides the Wi-Fi signaling detection, registration and connection with the Visited Wireless Network 110.

In some embodiments the, Hotspot Access Points 111 allow the end user devices to connect to the Wi-Fi network using IEEE 802.11a/b/n/g standards. The Access Gateway 112 implements the WISPr protocol, firewall control, and an AAA client that generates authentication requests on behalf of the end user. The AAA Proxy 113 interconnects with the AAA Proxy (e.g., 117) in an Intermediary Network (e.g., 115) or Home Network. The public Wi-Fi network can also include Monitoring tools, Billing and operation systems, and other components that are not relevant to this invention and thus that are not described in detail here.

The relevant components vary according to the home network type. For a WiMAX/CDMA Home Network, the relevant components include the AAA server that hosts the user account. For a GSM/WCDMA Home Network, the relevant components include the HLR system. Those skilled in the art will recognize corresponding components in other networks.

Figure 2:
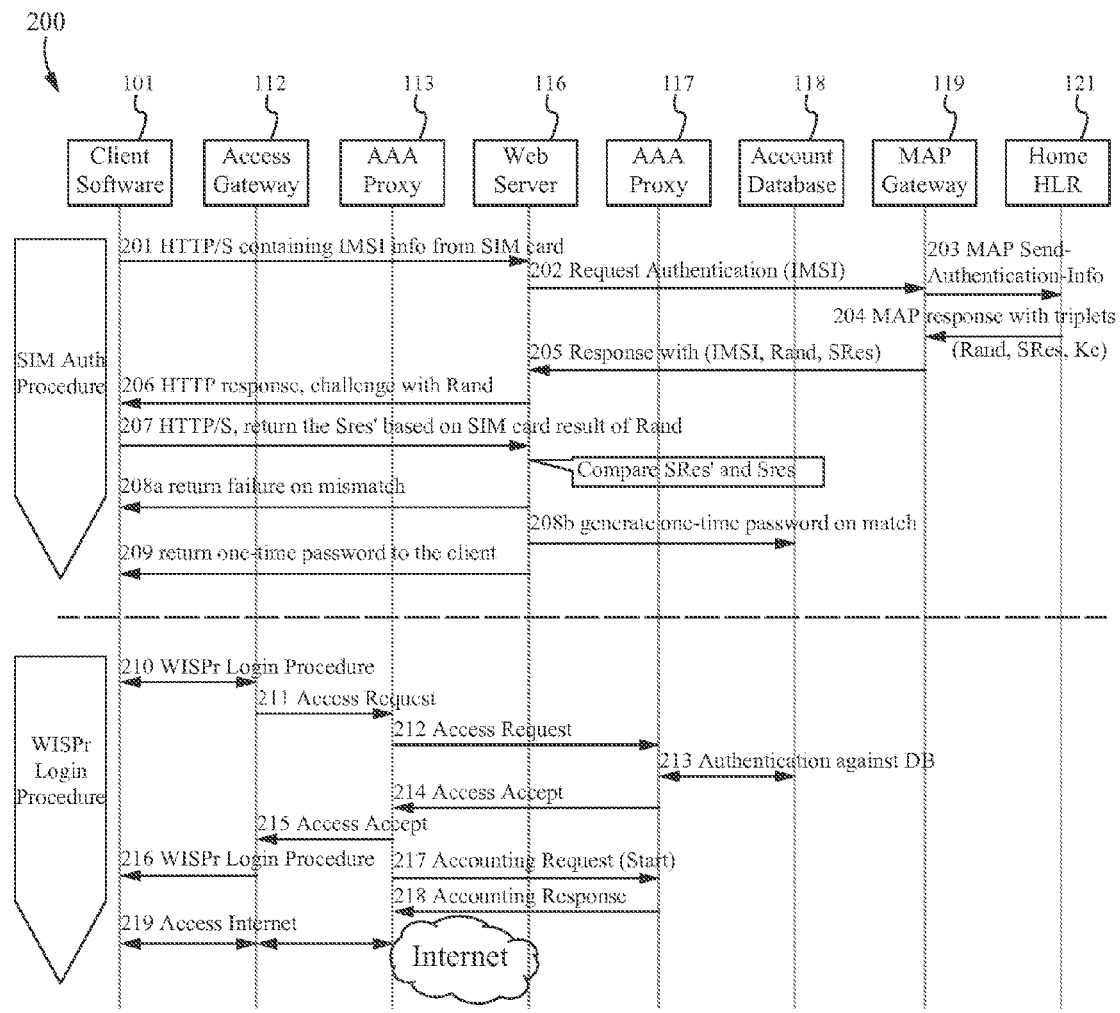
FIG. 2 illustrates a call flow between client software and the Authentication System within a Wi-Fi network's walled garden, in accordance with one embodiment of the present invention.

FIG. 2 illustrates the steps 200 of a flow diagram of an exemplary process for providing SIM-based authentication between a client (e.g., 101 in FIG. 1) and systems for those white listed Wi-Fi networks. As in all the figures, identical labels refer to the same element or step. As used herein, a "white listed" Wi-Fi network is one in which its firewall is open to allow user devices to access a known URL known before these devices are authenticated. In contrast, non-white listed Wi-Fi networks have firewalls that are not open to this URL. As such, "whitelisted" refers to networks inside a walled garden, and "non-whitelisted" refers to networks outside the walled garden.

When the end user's digital device enters into range of a public Wi-Fi network, the device scans for the WLAN network and then connects to the network. For SIM-based authentication, the digital device is equipped with a SIM card as the device credential.

Before the device credential is authenticated, the device is able to access the specified Authentication System that has been implemented in the Wi-Fi network walled garden. Thus, in the step 201, the client 101 on the device 100 retrieves the IMSI information from the SIM card 102, generates an HTTP/S request containing the IMSI information, and sends the request to the Authentication System (also referred to as Web Server) 116. In the step 202, the Web Server 116 sends a Request Authentication (including the IMSI) to the MAP Gateway 119. In the step 203, the MAP Gateway 119 then fetches the IMSI information for the request and generates an SS7 mobile application part (MAP) Send-Authentication to the HLR 121 in the Home Network to get the challenge vector from the home HLR 121.

As a standard procedure, in the step 204, the HLR 121 then generates RAND for this request, calculates the corresponding SRes according to the A3 algorithm, including the triplet (IMSI, RAND, SRes), and transmits this to the MAP Gateway 119 in the MAP Response. In the step 205, the MAP Gateway 119 transmits the triplet to the Web Server 116, which stores the triplet in a local database and, in the step 206, transmits to the client 101 an HTTP/S response containing a RAND value as the challenge.

On receiving the HTTP/S response, in the step 207, the client 101 inputs the RAND value to the SIM card 102 and retrieves the SRes' result from the SIM card 102. The SRes' result is calculated based on the RAND value and the embedded A3 algorithm in the SIM card 102. Then, in the step 207, the client 101 generates another HTTP/S request containing the SRes' and transmits it to the Web Server 116. The Web Server 116 then compares the SRes' received from the client 101 against the SRes that it stores after receipt from the Home HLR 121. If the SRes' and the SRes do not match, then in the step 208a, the Web Server 116 returns a Failure message in the HTTP/S response, thus preventing the client 101 from continuing the authentication procedure and denying it access to the Wi-Fi network. On the other hand, if the SRes' and the SRes do match, in the step 208b, the Web Server 116 generates a credential for the client 101, stores the credential in the Account Database 118, and, in the step 209, returns to the client 101a success message with the newly generated credential in the HTTP/S response message.

On receiving the success message, the client 101 is able to follow the standard WISPr 1.0 procedure to pass the Wi-Fi network authentication procedure, by using the credential information in the format of username, password and realm information. The procedure from step 210 to step 219 closely follows the procedure described in the document "Wireless ISP roaming (WISPr) 1.0", Appendix D of a "Smart Client to Access Gateway Protocol," incorporated by reference above. For example, in the step 210, the client 101 communicates with the Access Gateway 112 using the WISPr login procedure. In the step 211, the Access Gateway 112 issues an access request to the AAA Proxy 113. In the step 212, the AAA Proxy 113 issues an access request to the AAA Proxy 117. In the step 213, the AAA Proxy 118 performs an authentication against a database in the Account Database 118. In the step 214, the AAA Proxy 117 transmits an access accept message to the AAA Proxy 113, and in the step 215, the AAA Proxy 113 transmits an access accept message to the Access Gateway 112. In the step 216, the Access Gateway 112 completes the login procedure with the client 101. Concurrently with or soon after the step 215, the AAA Proxy 113 issues a Start Accounting request to the AAA Proxy 117, which responds with an Accounting Response in the step 218. Finally, in the step 219, the client 101 is allowed to access the Internet. In this embodiment, the authentication is conducted by the Authentication System 116 against the Account Database 118, which stores the credentials. Thus, the end user's device can successfully pass the authentication procedure as long as the client correctly utilizes the credential information generated by the Authentication System 116.

The client 101 and the Intermediary Network 115 can communicate using protocols that include, but are not limited to, HTTP, HTTPS, and Session Initiation Protocol (SIP). The AAA Proxy 113 can communicate with other components using Remote Authentication Dial in User Service (RADIUS), its replacement (DIAMETER), or other protocols.

Figure 3:
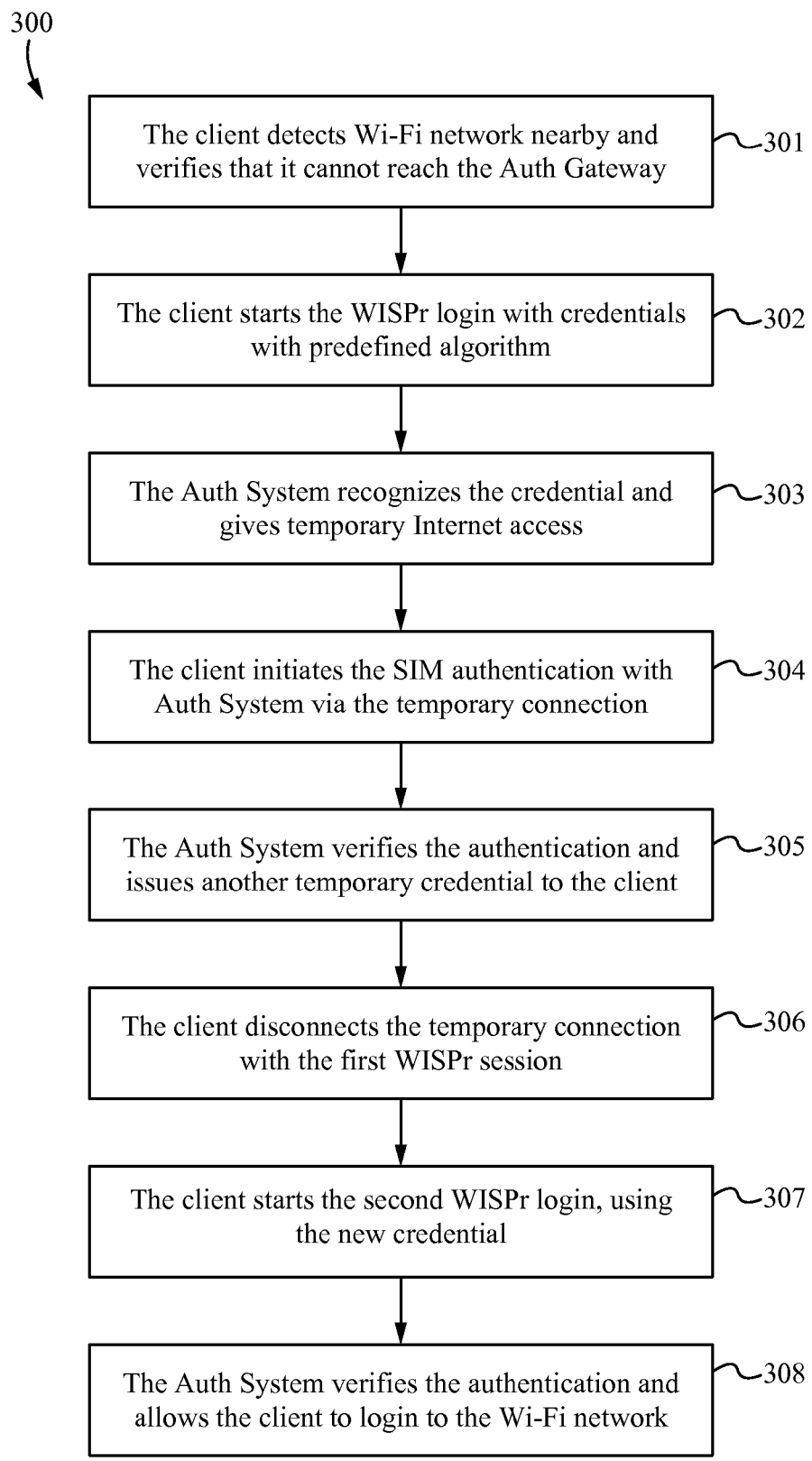
FIG. 3 shows the steps of a method of accessing a Wi-Fi network using components outside the Wi-Fi network's walled garden, in accordance with one embodiment of the present invention.

FIG. 3 illustrates the steps 300 of a method for accessing a Wi-Fi network using an Authentication System outside the Wi-Fi network's walled garden in accordance with one embodiment of the invention. For Wi-Fi networks that cannot implement the Authentication System in its walled garden, the client is not able to access the Authentication System before it is authenticated. Thus, this embodiment provides a way to temporarily allow the client to be authenticated.

Credential matching rules and algorithms can be preconfigured between the client software and the Authentication Gateway. Thus, in the step 301, the end user device enters a Wi-Fi network, the client detects that the Authentication System is not in the walled garden list of this Wi-Fi network. To detect that the wireless network does not include the Authentication System in the walled garden list, the client software uses a database or configuration file, which keeps a record of whether the network includes the Authentication System or not. Those skilled in the art will recognize that a service set identifier (SSID) can be used as the network identifier of the Wi-Fi network. In another embodiment, the client is triggered to connect to the Authentication Gateway, and if the network connection is rejected or redirected, then the Authentication System can be assumed to be outside of the walled garden list.

Next, in the step 302, the client starts the WISPr login with credentials using a predefined algorithm. In one embodiment, the predefined algorithm includes using special realm information plus special password generation rule. Thus, in the step 303, once the Authentication System receives the request from the Wi-Fi network via the WISPr login procedure, the Authentication System validates the request against the credential algorithms and acknowledges the login request by granting temporary Internet access. As one example, the temporary Internet access includes allowing timed use, such as between 1 and 5 minutes, and optionally rejecting repeated retries within short periods to avoid misuse.

In the step 304, the client is able to access the Internet, which can initiate the real authentication with Authentication System via the temporary connection. The steps 304 and 305 are exactly the same as the steps 201 to 209, described in FIG. 2. The Authentication System issues another temporary credential to the client once it successfully authenticates the SIM card against the Home HLR.

Starting from step 306, the client can automatically hang up the temporarily connection that is initiated in the step 302, using the standard WISPr logoff procedure with the first WISPr session information. In the step 307, the client re-initiates the second WISPr login procedure using the new credential received in the step 305. In the step 308, then the Authentication System is able to allow the client to login to the Wi-Fi network with a permanent network connection once it successfully verifies the credential it stores in the Account Database and the one it receives from the Wi-Fi network.

Figure 4:
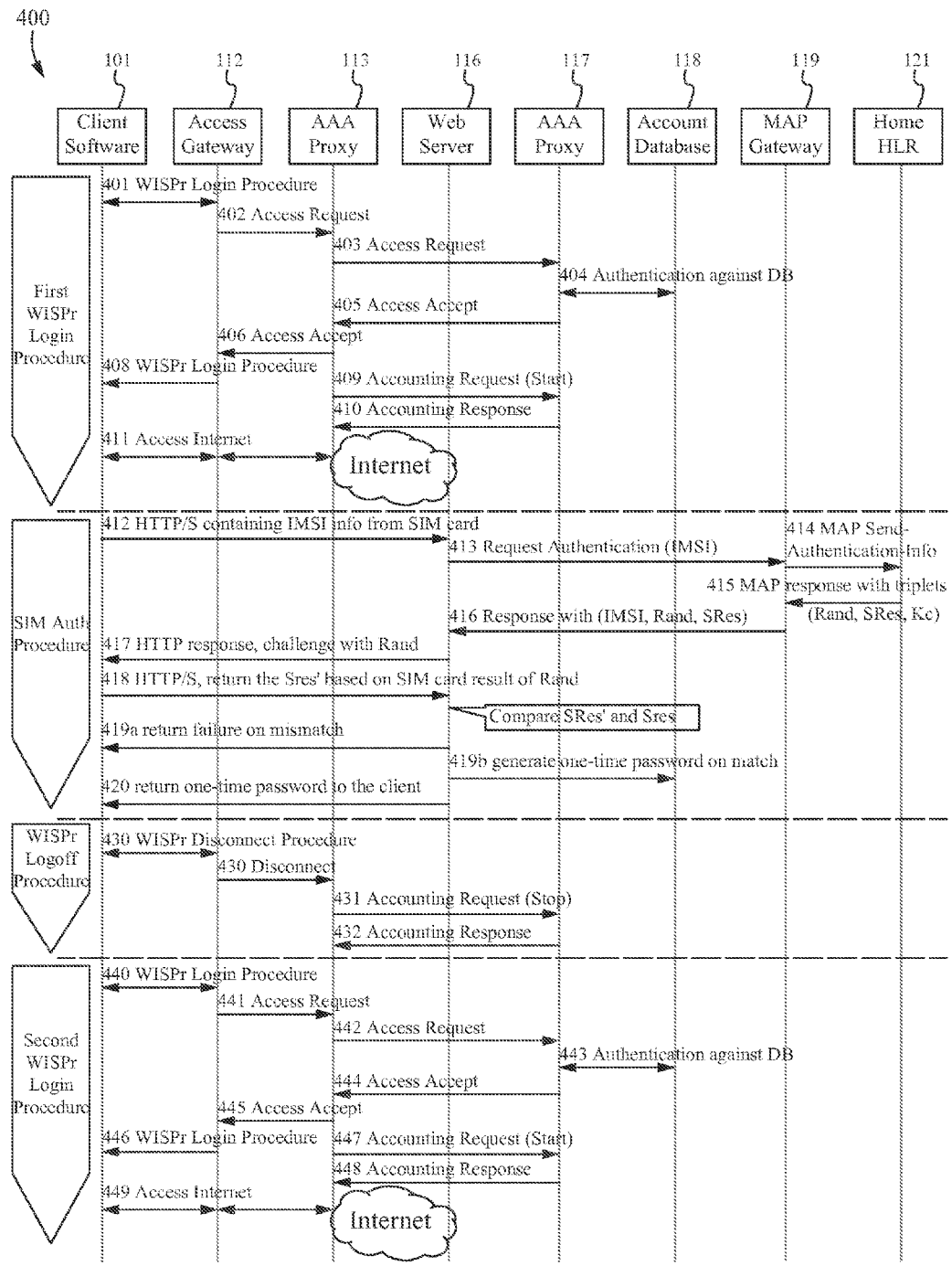
FIG. 4 illustrates a call flow between client software and an Authentication System for non-white listed Wi-Fi networks, outside the walled garden, in accordance with one embodiment of the invention.

FIG. 4 illustrates a call flow diagram of the steps 400 of an exemplary process for providing SIM based authentication between a client and systems for non-white listed Wi-Fi networks (e.g., outside the walled garden), in accordance with one embodiment of the invention. For the non-white listed Wi-Fi networks, the client is not able to access a Web Server before it is authenticated. The embodiment shown in FIG. 4 provides a way to temporarily allow the client to be authenticated.

From the step 401 to the step 411, the client closely follows the procedure described in the previously incorporated "Wireless ISP roaming (WISPr) 1.0," Appendix D of a "Smart Client to Access Gateway Protocol." During this procedure, the client uses a special predefined username, password and second realm information. The username is in the form of the IMSI that is retrieved from the SIM card, and the password is randomly generated by the client. In this embodiment, the second special realm is different from the previous first realm, and is predefined and recognizable in the Intermediary Network AAA Proxy. Special policies are configured in the Intermediary Network AAA Proxy for this second realm and include: ignore the password and always return success for all authentication requests against this realm; always return authorization with limited Internet access duration (e.g., one to five minutes); reject repeated retries within short periods of time to avoid misuse; etc. With such policies, the Intermediary Network AAA Proxy returns Access-Accept to the Visited Wi-Fi Network AAA Proxy. Thus the Visited Network Access Gateway allows the device to access the Internet for a limited period of time. Accordingly, in the step 411, the client is able to access the Internet.

Once the Internet is accessible, the client is able to get in touch with the Web Server, and another authentication procedure is initiated between the client and the Web Server. The procedure from the step 412 to the step 420 is exactly the same procedure as the step 201 to the step 209 as shown in FIG. 2, and accordingly these steps are not described in detail here.

On receiving the HTTP/S success response message with a one-time password included in the step 420, the client knows that it is successfully authenticated with the actual credential. But since the client software has been granted temporary Internet access using a dummy password in the first WISPr login procedure, the client needs to shutdown the temporary Internet access and re-establish a new Internet access with the new password. Thus from the step 430 to the step 432, the client follows the WISPr logoff procedure to disconnect the temporary Internet access. From the step 440 to the step 449, the client follows the WISPr login procedure to be authenticated with a new username and the one-time password, and then re-establishes a totally new Internet access. This login procedure is exactly the same as the steps 210 to 219 in FIG. 2.

It will be appreciated that the steps 300 and the calls 200 and 400 are merely illustrative. In other embodiments, some of the steps or calls are deleted, others are added, and the order of the steps or calls is changed.

It will also be appreciated that in different embodiments, some or all of the components shown in FIG. 1 include a memory storing computer-executable instructions for executing one or more of the corresponding steps 300 or calls 200 and 400 and a processor for executing those corresponding steps or calls. In other embodiments, the components contain application specific integrated circuits or similarly functioning components for executing the steps or calls.

While the embodiments described above use the WIPr 1.0 protocol, it will be appreciated that other versions of WISPr, as well as different protocols, can also be used.

The present invention has been described above with reference to exemplary embodiments. It will be apparent to those skilled in the art that various modifications may be made to the embodiments without departing from the spirit and scope of the invention as defined by the appended claims.

What is claimed is:

1. A method of granting a user access to a wireless network comprising:
    validating credential information of a user device at an Intermediary Authentication System by utilizing a Home Authentication System to generate a set of authentication tools, wherein the user device and Home Authentication System are separate from the Intermediary Authentication System; and
    on successfully authenticating the credential information, granting the user device a temporary credential by the Intermediary Authentication System in a credential format of the wireless network, thereby allowing the user device to access the wireless network.

2. The method of claim 1, wherein the user credential comprises a SIM card, a USIM card, a R-UIM card, or a functionally similar component.

3. The method of claim 2, further comprising:
    retrieving a user identification from the credential;
    transferring the user identification to the Intermediary Authentication System;
    receiving a challenge request from the Intermediary Authentication System;
    generating a challenge response from the credential using a challenge parameter as input;
    transferring the challenge response to the Intermediary Authentication System; and
    receiving an authentication result and an authorization result.

4. The method of claim 3, wherein the user identification comprises an IMSI, an MSISDN, or a user name.

5. The method of claim 3, wherein the challenge request comprises a random number or a secret key.

6. The method of claim 3, wherein the validating the credential information at the Intermediary Authentication System further comprises:
    receiving the user identification from a client executing on the user device;
    communicating with the Home Authentication System to retrieve challenge vectors;
    transferring the challenge vectors to the client;
    validating the challenge response from the client by comparing it with the challenge response from the Home Authentication System; and
    issuing the temporary credential for the user device to login to the wireless network.

7. The method of claim 1, wherein the Home Authentication System comprises an HLR, an HSS or a Subscriber Management System in a GSM, a CDMA, an EDGE, or an LTE network.

8. The method of claim 1, wherein allowing the user device to the access the wireless network comprises using a WISPr 1.0 protocol and a login procedure supported by the wireless network.

9. The method of claim 8, wherein a communication protocol between the Intermediary Authentication System and Home Authentication System comprises MAP, IS-41, or AAA.

10. The method of claim 8, wherein communication between the Intermediary Authentication System and the client is performed using TCP/IP.

11. The method of claim 1, wherein the wireless network is a Wi-Fi network.

12. The method of claim 11, wherein a communication protocol between the Intermediary Authentication System and the client is selected from the group consisting of HTTP, HTTPS, and Session Initiation Protocol (SIP).

13. The method of claim 1, wherein the validating comprises exchanging a challenge token from the authentication tools and a response to the challenge between a client running on the user device and the Intermediary Authentication System.

14. The method of claim 1, wherein the temporary credential is configured to only enable a single access of the wireless network by the user device using the temporary credential.

15. A method of granting a user device access to a wireless network comprising:
   detecting with a user device that the wireless network does not include an Intermediary Authentication System in a walled garden;
   initiating a temporary Internet connection with the wireless network with the Intermediary Authentication System using predefined credential rules recognized by the Intermediary Authentication System;
   validating user credential information at the Intermediary Authentication System by utilizing a Home Authentication System to generate a set of authentication tools over the temporary Internet connection, wherein the user credential information is separate from the predefined credential rules;
   on successfully validating the user credential information, granting the user device a temporary credential in a credential format of the wireless network;
   tearing down the temporary Internet connection; and
   accessing the wireless network using the temporary credential format.

16. The method of claim 15, wherein detecting that the wireless network does not include the Authentication System in the walled garden comprises using a database storing one or more wireless network profiles.

17. The method of claim 15, wherein initiating a temporary Internet connection comprises using WISPr 1.0 protocol and a login procedure supported by the wireless network.

18. The method of claim 15, wherein tearing down the temporary Internet connection comprises using WISPr 1.0 protocol and a logoff procedure supported by the wireless network.

19. An Authentication System for completing an authentication and registration procedure in a wireless network by utilizing a user credential of a mobile device, the Authentication System comprising a memory containing computer-executable instructions that when executed by a processor perform a method comprising:
   receiving identifier information of a user credential associated with a wireless device;
   communicating with a Home Authentication Server to retrieve challenge vectors;
   transferring the challenge vectors to a client executing on the wireless device;
   validating a challenge result from the client, at the Authentication System, against a response from the Home Authentication Server, wherein the Home Authentication Server, the Authentication System, and the wireless network are separate from one another; and
   granting the wireless device access to the wireless network.

20. The Authentication System of claim 19, wherein the receiving identifier information and communicating with the client is performed over a TCP/IP network.

21. The Authentication System of claim 20, wherein a protocol for communicating with the client is selected from the group consisting of HTTP, HTTPS, and Session Initiation Protocol (SIP).

22. The Authentication System of claim 20, wherein a communication protocol between Authentication System and the Home Authentication System is MAP, IS-41 or AAA.

23. The Authentication System of claim 20, wherein granting the wireless device access to the wireless network comprises issuing the wireless device a temporary credential.

24. The Authentication System of claim 23, wherein the temporary credential comprises an authorization token.

25. The Authorization System of claim 24, wherein the authorization token is a one-use token.

26. The Authorization System of claim 24, wherein the authorization token is a multiple-use token.

27. The Authorization System of claim 24, wherein granting the wireless device access to the wireless network comprises storing the authorization token into a database.

28. A method of authenticating a user comprising:
   verifying authentication requests from a Wi-Fi network by validating credential information of a user device at an Intermediary Authentication System utilizing a Home Authentication System to generate a set of authentication tools;
   granting a user device access to the Wi-Fi network by issuing different authorization results; and
   on receiving accounting requests, generating an accounting record for the user device.

29. The method of claim 28, wherein a protocol for communicating with an AAA system of the Wi-Fi network is over RADIUS or Diameter.

30. The method of claim 28, wherein the different authorization results include permanent Internet access or limited Internet access for only a pre-defined duration.

31. A wireless system comprising one or more computer memories containing computer-executable instructions that when executed by a processor perform a method comprising:
   detecting that the wireless network does not include an Authentication System in a walled garden;
   initiating a temporary Internet connection with the wireless network with predefined credential rules recognized by an Authentication Gateway;
   validating, at the Authentication system, user credential information associated with a user device against a Home Authentication System over the temporary Internet connection, wherein the walled garden, the Authentication System, and the Home Authentication System are separate from one another;
   on successfully validating the user credential information, granting the user device a temporary credential in a credential format of the wireless network;
   tearing down the temporary Internet connection; and
   accessing the wireless network using the temporary credential.

32. The wireless system of claim 31, wherein the detecting that the wireless network does not include the Authentication System in the walled garden comprises using a database storing one or more wireless network profiles.

33. The wireless system of claim 31, wherein the initiating a temporary Internet connection comprises using WISPr 1.0 protocol and a login procedure supported by the wireless network.

34. The wireless system of claim 31, wherein the tearing down the temporary Internet connection comprises using WISPr 1.0 protocol and a logoff procedure supported by the wireless network.

35. The wireless system of claim 31, wherein the wireless network comprises a Wi-Fi network.

36. The wireless device of claim 35, wherein the user identification comprises an IMSI, an MSISDN, or a username.

37. A wireless device comprising a computer memory containing computer-executable instructions that when executed by a processor perform a method comprising:
   retrieving user identification from a user credential;

transferring the user identification to a remote Authentication System;

receiving a challenge request from the remote Authentication System;

generating a challenge response from the user credential using a challenge parameter as input;

transferring the challenge response to the remote Authentication System, wherein the challenge response is validated at the remote Authentication System against a challenge response from a Home Authentication System;

receiving an authentication result and an authorization result; and transferring the authentication result to the remote Authentication System, wherein the authentication result is validated against a database on the remote Authentication System.

38. The wireless device of claim 37, wherein the challenge request comprises a random number or a secret key.

* * * * *